Dec. 2, 1947.    M. A. RAINES    2,431,890
METHOD AND RECEPTACLE FOR PROPAGATING PLANTS
Filed Aug. 1, 1942
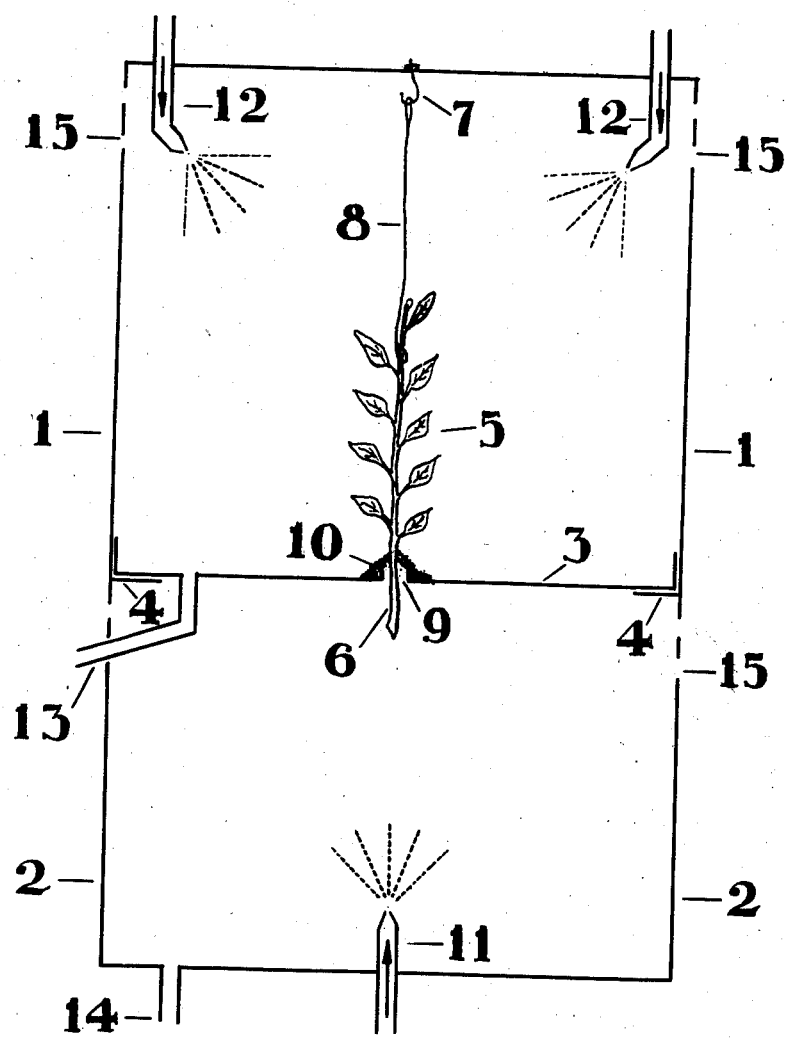
Morris A. Raines
Inventor Patented Dec. 2, 1947

2,431,890

UNITED STATES PATENT OFFICE 2,431,890

METHOD AND RECEPTACLE FOR PROPAGATING PLANTS

Morris A. Raines, Washington, D. C., assignor to Research Corporation, New York, N. Y., a corporation of New York Application August 1, 1942, Serial No. 453,261

50 Claims. (Cl. 47—1)

This invention relates to the art of propagating vascular plants—that is, plants of the two natural groups (namely, the Pteridophyta or fern plants, and the Spermatophyta or seed plants) which normally develop root, stem and leaf structures, although these structures may sometimes be greatly modified or reduced in size. And it relates more particularly to the art of propagating such plants by cuttings—that is by regeneration from a plant part or portion. This application is a continuation in part of my co-pending applications Serial No. 314,167, filed January 16, 1940, and Serial No. 374,918, filed January 17, 1941.

I have discovered that I regularly obtain relatively greater success in propagating many plants by cuttings by following a procedure comprising:

A. Supporting the plant cutting during substantially the entire regeneration period in air—either the entire cutting, or the regeneration region only of the cutting, or the non-regeneration region only. And supporting the cutting with the regeneration and non-regeneration regions in the same chamber, or in different chambers.

B. Subjecting all, or a portion, of the plant cutting continuously or at intervals during substantially the entire regeneration period to a spray of water—especially when the temperature of the cutting is increasing or has recently increased; and also especially when the cutting is illuminated, more particularly when it is strongly illuminated.

C. Preventing water from flowing from surfaces of the non-regeneration region of the cutting to its regeneration region.

By the "regeneration period" I have reference to the period of time starting with the placing of the plant cutting in environmental conditions favorable to active plant growth, and continuing to the time of first appearance on the cutting of the newly regenerated plant parts or structures.

Three kinds of cuttings commonly employed in propagating plants are:

1. Leaf cuttings—consisting of all or a portion of a leaf.
2. Stem cuttings—consisting of all or a portion of a stem, whether with or without developed leaf structures.
3. Root cuttings—consisting of all or a portion of a root.

By the "regeneration region" of a plant cutting I have reference to the region of the cutting (whether naturally occurring or artificially induced) where regeneration of missing plant parts and structures is normally expected to take place. In the case, for instance, of a leaf cutting, consisting of an entire leaf with its petiole, supported in a vertical position with the petiole downwards, the regeneration region is normally near the lower end of the petiole. In the case of a stem cutting (with leaves) supported in a vertical position with the basal end (that originally nearest the plant roots) downwards, the regeneration region is normally near the lower end of the cutting. In the case of a root cutting supported in a vertical position with the basal end (that originally nearest the stem) upwards, the regeneration region is normally near the upper end of the cutting. Regeneration also, or preferably, at other regions of the plant cutting can often be artificially induced—as by a knife cut or other mechanical injury, or by the application of suitable chemical or other agents.

By the "non-regeneration region" I obviously have reference to the remaining portion of the plant cutting. The regeneration and non-regeneration regions, together, constitute the entire plant cutting.

With regard to the regeneration by a plant cutting of missing plant parts or structures, I have reference, in the case of a leaf cutting, to the regeneration only of root structure, or root and stem structure; in the case of a stem cutting, to the regeneration only of root structure; in the case of a root cutting, to the regeneration only of stem structure or leaf structure.

By "air" I have reference to any suitable gas or mixture of gases, including the gaseous mixture of the earth's atmosphere.

By "spray of water" I have reference to any suitable dispersion in air of water in the liquid form—whether it be described as a fine rain, spray, mist, or fog.

The spray of water to which the plant cutting is subjected may be of three kinds:

I. It may be a humidifying spray—that is, only sufficient, on the whole, to maintain at high level (near, or at, saturation) the relative humidity of the air in the immediate vicinity of the plant cutting (the air in which the plant cutting is supported), or II. It may be a wetting spray—that is, only sufficient, on the whole, to wet the surfaces of the cutting (as evidenced by a tendency to deposition of droplets of water on these surfaces; these droplets may be sufficiently close together to fuse into a film of water), or III. It may be a washing spray—that is, sufficient to form regularly, on the surfaces of the plant cutting, drops of water large enough to run off.

It is evident that a wetting spray, in addition to its wetting action, also has a humidifying action. And it is likewise evident that a washing spray, in addition to its washing action, also has a humidifying and a wetting action. That is to say, the procedure of wetting, here, comprehends the procedure of humidifying; and, similarly, the procedure of washing, here, comprehends the procedures of wetting and humidifying.

The humidifying spray has the beneficial action of retarding and limiting the decrease in water content and tissue turgor of the plant cutting. I have found that subjecting a plant cutting to a humidifying spray usually obviates the deleterious effects on the cutting frequently associated with an increase in the temperature of the propagating chamber—such as usually takes place in the transition from night to day, and from cloudiness of sky to full sunshine. The humidifying spray serves to restore the high relative humidity of the propagating chamber much more quickly than the traditional procedures of occasionally wetting down the floor and walls of the propagating house. The humidifying spray apparently affects the cutting beneficially also in other ways. I have found a humidifying spray especially beneficial in the propagation by cuttings of xerophytic plants, and such mesophytic plants, as the grape, the physiology of the cutting of which is benefited by a small amount of water loss and decrease of tissue turgor.

The wetting spray has the beneficial action of keeping the plant tissues fully turgid—replacing water lost by evaporation—and also making possible new growth. By means of a wetting spray tissue turgor not only may be maintained but, especially by using a spray of distilled water, may be actually increased. In this way, the physiological processes of the plant may be profoundly altered. The wetting spray apparently affects the cutting beneficially also in other ways.

I have established that when a plant cutting is supported in air near or at 100% relative humidity in a glass walled propagating chamber in daylight (especially in strong daylight, or in sunlight; or otherwise strongly illuminated), the surfaces of the cutting are usually somewhat warmer than the air in the propagating chamber, and than the chamber walls. This is understandable from the fact that the cutting surfaces are almost always more light-absorbent than the chamber walls and the air in the chamber. As a consequence, water is evaporated from the cutting, to be condensed on the chamber walls. This deleterious effect of illumination on the cutting is obviated by subjecting the cutting to a wetting spray. In this way the tissue turgor of the cutting may be fully maintained, and even increased, even though it is strongly illuminated, as by full sunlight.

The wetting spray, I have found, enhances the practicability of using large cuttings which, in many cases, have a relatively shorter regeneration period, and also are more desirable because of the greater initial size of the new plants obtained.

The washing spray I have discovered to have a beneficial action on the sanitation of the cutting—retarding and inhibiting the development of molds and similar parasitic or saprophytic growths on the surfaces of the cutting; and, on the whole, reducing the incidence of saprophytic overgrowths and paratitic infections and infestations in general. Relatively fewer plant cuttings, therefore, are weakened or lost entirely by disease.

I have further discovered that a washing spray may have profound effects on the chemical composition and physiological processes of many cuttings—effects such as: decrease of dry weight; decreased content of mineral salts; alteration of the carbon-nitrogen ratio; alteration of rate of respiration; alteration of hormone content. Excessive washing may be decidedly harmful to a plant cutting. But, in the case of many cuttings, a washing spray greatly stimulates regeneration. The washing spray apparently affects the cutting beneficially also in other ways.

In subjecting a cutting to a spray of water, the water particles may be applied directly from a spray head; or indirectly, by being in suspension in a current of air in which the cutting is supported; or water particles may be induced to condense on the surfaces of the cutting from water vapor in the air in which the cutting is supported.

A simple form of the means for carrying out my method of propagating vascular plants by cuttings, as above set forth, is illustrated diagrammatically in the accompanying drawing. The view is in vertical section.

Referring to the drawing: 1 indicates the upper chamber and 2 the lower chamber of a receptacle which is divided into two chambers by the removable tray 3 resting on the shelves 4. 7 indicates a hook projecting from the roof of the upper chamber, at its center. 9 indicates an opening in the center of the tray 3 (which forms the floor of the upper chamber and the roof of the lower chamber). 5 indicates a leafy stem cutting which is suspended from the hook 7 by means of a length of twine 8 (made of chemically resistant, continuous-filament glass fibers) so that the lower portion 6 of the cutting is passed through the opening 9 and is situated below the tray 3. The cutting, therefore, is supported with its non-regeneration region in the upper chamber, and its regeneration region in the lower chamber, of the receptacle. 10 indicates a ring of putty applied around the cutting, where it passes through the opening 9, so as to close this opening. This putty has been selected to meet the specification of being non-irritating to the cutting, of remaining plastic for a considerable time, and of being readily removable. 11 indicates a spray-head situated in the lower chamber, by means of which the regeneration region of the cutting may be subjected to a spray of water. 12 indicates spray-heads situated in the upper chamber, by means of which the non-regeneration region of the cutting may be subjected to a spray of water. 13 indicates a drain pipe for the tray 3 (which forms the bottom of the upper chamber), and 14 indicates a drain pipe in the bottom of the lower chamber. 15 indicates openings in the sides of the chambers, suitable for such purposes as those of ventilation, inspection, the carrying on of manipulations within the chambers, the adjustment and control of the gaseous composition of the air in the chambers, and the bringing into the chambers of services such as electricity, light, heating elements, cooling elements, sources of radiant energy, and the like.

The two sprays of water—11, in the lower chamber, and 12, in the upper chamber—are separate and independent of one another, so that the portion of the plant cutting situated in one of the chambers may be subjected to a wetting spray, for instance, while the portion of the cutting situated in the other chamber may be subjected to a washing spray. The two sprays of water may also differ qualitatively and/or quantitatively in other respects. However, the two sprays of water are used in cooperation with each other, in that subjecting both the regeneration and non-regeneration regions of the plant cutting to sprays of water during the regeneration period is often beneficial in maintaining the health and vigor of the plant cutting, and also in inducing successful regeneration in the case of cuttings from species of plants which are commonly difficult to propagate by cuttings.

The procedure of supporting the plant cutting with its regeneration and non-regeneration regions in different chambers facilitates treating these portions of the cutting differently not only in the matter of the spray of water to which each is subjected, but also in other ways—such as temperature, illumination, and humidity, pressure, and composition of air. I have frequently found it advantageous, in the case of stem cuttings supported with both the regeneration and non-regeneration regions in air, to illuminate the non-regeneration region more strongly than the regeneration region; to shade the regeneration region, as by wrapping it in porous, water-holding material such as sphagnum; to support the regeneration region in air of an oxygen content different from that of the air in which the non-regeneration region is supported, especially a lower oxygen content; to support the regeneration region in air of a carbon-dioxide content different from that of the air in which the non-regeneration region is supported, especially a higher carbon-dioxide content; to support the regeneration region in air containing vapors of chemicals promoting regeneration. These treatments, and differences in treatment, of the regeneration and non-regeneration regions of the cutting are, in each case, maintained during substantially the entire regeneration period.

It will be noted that, as a result of the regeneration and non-regeneration regions of the cutting being situated in separate chambers, any treatment to which one of these regions is subjected—such as spray of water, light, air of certain composition or condition, and the like—is restricted to that region of the cutting, and the other region of the cutting shielded therefrom.

It will also be noted that, by means of the ring of putty, 10, applied around the cutting so as to close the opening 9, water is prevented from flowing along surfaces of the cutting from its non-regeneration to the regeneration region; and, generally, water is prevented from flowing from surfaces of the non-regeneration region of the cutting to its regeneration region. I have discovered that water which has been in contact with the bark of many woody plants, such as oak, chestnut, pine, locust, is toxic to roots, inhibiting their development. And I have indeed found that preventing water from flowing from surfaces of the non-regeneration region of many cuttings to the regeneration region of the cutting is, frequently, decidedly beneficial to root development. This "bark effect," as I have called it, may also be ameliorated by removing the outermost layer of the bark, as by sand blasting the surfaces of the cutting.

Preventing water from flowing from surfaces of the non-regeneration region of a stem cutting to its regeneration region, and along surfaces of the cutting from its non-regeneration region to the regeneration region, apparently also has other beneficial effects on the cutting.

By the methods here described I have been able to effect decided improvements in the propagation by stem cuttings of many plants including apple, pear, peach, cherry, sycamore, tulip tree, walnut, locust, oak, elm, dogwood, red-bud, barberry, lilac, holly, poinsettia. Some of these I have never been able to propagate by any methods previously tried by me. I have also applied my new methods successfully and to advantage to propagation by leaf cuttings of begonia, bryophyllum and kalanchoe; and to propagation by root cuttings of chicory.

The applicant has pending application Serial No. 353,736, filed August 22, 1940—for Methods and apparatus for treating plants. This relates to the use of a spray of water for treating plants which are in a condition of root insufficiency.

The applicant has also pending application Serial No. 391,588, filed May 2, 1941—for Methods and receptacles for growing plants. This relates to supplying nutrients to plant roots in the form of a dispersion in air.

Having described my invention, I claim:

1. The method of propagating plants by cuttings which comprises subjecting a plant cutting substantially continuously during substantially the entire regeneration period thereof to a spray of water.

2. The method of propagating plants by cuttings which comprises subjecting a plant cutting substantially continuously during substantially the entire regeneration period thereof to a humidifying spray of water.

3. The method of propagating plants by cuttings which comprises subjecting a plant cutting at intervals during substantially the entire regeneration period thereof to a humidifying spray of water.

4. The method of propagating plants by cuttings which comprises subjecting a plant cutting substantially continuously during substantially the entire regeneration period thereof to a wetting spray of water.

5. The method of propagating plants by cuttings which comprises subjecting a plant cutting at intervals during substantially the entire regeneration period thereof to a wetting spray of water.

6. The method of propagating plants by cuttings which comprises subjecting a plant cutting substantially continuously during substantially the entire regeneration period thereof to a washing spray of water.

7. The method of propagating plants by cuttings which comprises subjecting a plant cutting, during the regeneration period thereof, to illumination; and further subjecting said plant cutting, substantially coincidental with said illumination, to a humidifying spray of water.

8. The method of propagating plants by cuttings which comprises subjecting a plant cutting, during the regeneration period thereof, to illumination; and further subjecting said plant cutting, substantially coincidental with said illumination, to a wetting spray of water.

9. The method of propagating plants by cuttings which comprises effecting an increase in the temperature of a plant cutting during the regeneration period thereof, and further subjecting said plant cutting, during the time in which said increase in temperature of the plant cutting is being effected, to a humidifying spray of water.

10. The method of propagating plants by cuttings which comprises effecting an increase in the temperature of a plant cutting during the regeneration period thereof, and further subjecting said plant cutting, during the time in which said increase in temperature of the plant cutting is being effected, to a wetting spray of water.

11. A receptacle for propagating plants by cuttings comprising, a chamber, means for supporting a plant cutting in air of said chamber, means for applying water to surface of the non-regeneration region of said plant cutting, and further means for preventing water, which has been in contact with surfaces of the non-regeneration region of said plant cutting, from flowing therefrom to the regeneration region of said plant cutting.

12. A receptacle for propagating plants by cuttings comprising, a chamber, means for supporting a plant cutting in air of said chamber, means for applying water to surface of the non-regeneration region of said plant cutting, and further means for preventing water from flowing along surfaces of said plant cutting from the non-regeneration to the regeneration regions thereof.

13. The method of propagating plants by cuttings which comprises subjecting a plant cutting during substantially the entire regeneration period to a spray of water.

14. The method of propagating plants by cuttings which comprises subjecting a plant cutting during substantially the entire regeneration period to a humidifying spray of water.

15. The method of propagating plants by cuttings which comprises subjecting a plant cutting during substantially the entire regeneration period to a wetting spray of water.

16. The method of propagating plants by cuttings which comprises subjecting a plant cutting during substantially the entire regeneration period to a washing spray of water.

17. The method of propagating plants by cuttings which comprises subjecting a plant cutting during substantially the entire regeneration period to a spray of water, and further shielding the regeneration region of said plant cutting from said spray of water.

18. The method of propagating plants by cuttings which comprises subjecting a plant cutting during substantially the entire regeneration period to a spray of water, and further shielding the non-regeneration region of said plant cutting from said spray of water.

19. The method of propagating plants by cuttings which comprises subjecting the non-regeneration region of a plant cutting during substantially the entire regeneration period to a spray of water, and further restricting said spray of water to said non-regeneration region of said plant cutting.

20. The method of propagating plants by cuttings which comprises subjecting the regeneration region of a plant cutting during substantially the entire regeneration period to a spray of water, and further restricting said spray of water to said regeneration region of said plant cutting.

21. The method of propagating plants by cuttings which comprises supporting a plant cutting during substantially the entire regeneration period with both the regeneration and non-regeneration regions thereof substantially entirely in air, and further subjecting said plant cutting during substantially the entire regeneration period to a spray of water.

22. The method of propagating plants by cuttings which comprises supporting a plant cutting during substantially the entire regeneration period with both the regeneration and non-regeneration regions thereof substantially entirely in air, and further subjecting the regeneration region of said plant cutting during substantially the entire regeneration period to a spray of water.

23. The method of propagating plants by cuttings which comprises supporting a plant cutting during substantially the entire regeneration period with both the regeneration and non-regeneration regions thereof substantially entirely in air, and further subjecting the non-regeneration region of said plant cutting during substantially the entire regeneration period to a spray of water.

24. The method of propagating plants by cuttings which comprises supporting a plant cutting during substantially the entire regeneration period with both the regeneration and non-regeneration regions thereof substantially entirely in air, subjecting the regeneration region of said plant cutting to a spray of water, and further subjecting the non-regeneration region of said plant cutting to a separate and independent spray of water.

25. The method of propagating plants by cuttings which comprises supporting a plant cutting during substantially the entire regeneration period with both the regeneration and non-regeneration regions thereof substantially entirely in air, subjecting the regeneration region of said plant cutting during substantially the entire regeneration period to a spray of water, subjecting the non-regeneration region of said plant cutting during substantially the entire regeneraion period to a separate and independent spray of water, shielding the regeneration region of said plant cutting from the spray of water to which the non-regeneration region of said plant cutting is subjected, and further shielding the non-regeneration region of said plant cutting from the spray of water to which the regeneration region of said plant cutting is subjected.

26. The method of propagating plants by cuttings which comprises supporting a plant cutting during substantially the entire regeneration period with the regeneration and non-regeneration regions thereof in separate chambers, and further subjecting said plant cutting at intervals during substantially the entire regeneration period to a spray of water.

27. The method of propagating plants by cuttings which comprises supporting a plant cutting during substantially the entire regeneration period with the regeneration and non-regeneration regions thereof in separate chambers, and further subjecting the regeneration region of said plant cutting substantially continuously during substantially the entire regeneration period to a spray of water.

28. The method of propagating plants by cuttings which comprises supporting a plant cutting during substantially the entire regeneration period with the regeneration and non-regeneration regions thereof in separate chambers, and further subjecting the regeneration region of said plant cutting at intervals during substantially the entire regeneration period to a spray of water.

29. The method of propagating plants by cuttings which comprises supporting a plant cutting during substantially the entire regeneration period with the regeneration and non-regeneration regions thereof in separate chambers, and further subjecting the non-regeneration region of said plant cutting substantially continuously during substantially the entire regeneration period to a spray of water.

30. The method of propagating plants by cuttings which comprises supporting a plant cutting during substantially the entire regeneration period with the regeneration and non-regeneration regions thereof in separate chambers, and further subjecting the non-regeneration region of said plant cutting at intervals during substantially the entire regeneration period to a spray of water.

31. The method of propagating plants by cuttings which comprises supporting a plant cutting during substantially the entire regeneration period with the regeneration region and non-regeneration regions thereof in separate chambers, subjecting the regeneration region of said plant cutting during substantially the entire regeneration period to a spray of water, and further subjecting the non-regeneration region of said plant cutting during substantially the entire regeneration period to a separate and independent spray of water.

32. A receptacle for propagating plants by cuttings comprising a chamber, means for supporting a plant cutting with the regeneration region thereof in air of said chamber, means for subjecting the said regeneration region of said plant cutting to a spray of water, and means for restricting said spray of water to the said regeneration region of the said plant cutting.

33. A receptacle for propagating plants by cuttings comprising a chamber, means for supporting a plant cutting with the regeneration region thereof in air of said chamber, means for subjecting the said regeneration region of said plant cutting to a spray of water, and means for shielding the non-regeneration region of said plant cutting from the said spray of water.

34. A receptacle for propagating plants by cuttings comprising a chamber, means for supporting a plant cutting with both the regeneration and non-regeneration regions thereof substantially entirely in air of said chamber, means for subjecting the regeneration region of said plant cutting to a spray of water, and further means for subjecting the non-regeneration region of said plant cutting to a separate and independent spray of water.

35. A receptacle for propagating plants by cuttings comprising a chamber, means for supporting a plant cutting with both the regeneration and non-regeneration regions thereof substantially entirely in air of said chamber, means for subjecting the regeneration region of said plant cutting to a spray of water, means for subjecting the non-regeneration region of said plant cutting to a separate and independent spray of water, means for shielding the regeneration region of said plant cutting from the spray of water to which the non-regeneration region of said plant cutting is subjected, and means for shielding the non-regeneration region of said plant cutting from the spray of water to which the regeneration region of said plant cutting is subjected.

36. A receptacle for propagating plants by cuttings comprising a chamber, means for supporting a plant cutting with the non-regeneration region thereof in air of said chamber, means for subjecting said plant cutting to a spray of water, and means for preventing water from flowing along surfaces of said plant cutting from the non-regeneration to the regeneration regions thereof.

37. A receptacle for propagating plants by cuttings comprising two chambers, means for supporting a plant cutting with the regeneration region thereof in one of said chambers and the non-regeneration region thereof in the other of said chambers, means for subjecting the non-regeneration region of said plant cutting to a spray of water, and further means for subjecting the regeneration region of said plant cutting to a separate and independent spray of water.

38. The method of propagating plants by cuttings which comprises supporting a plant cutting during the regeneration period thereof in air of a relative humidity of less than 100 per cent, and further subjecting said plant cutting substantially continuously during the time that it is supported in said air of said condition of a relative humidity of less than 100 per cent. to a spray of water.

39. The method of propagating plants by cuttings which comprises supporting a plant cutting during the regeneration period thereof in air of a relative humidity of less than 100 per cent., and further subjecting said plant cutting substantially continuously during the time that it is supported in said air of said condition of a relative humidity of less than 100 per cent. to a humidifying spray of water.

40. The method of propagating plants by cuttings which comprises supporting a plant cutting during the regeneration period thereof in air of a relative humidity of less than 100 per cent., and further subjecting said plant cutting substantially continuously during the time that it is supported in said air of said condition of a relative humidity of less than 100 per cent. to a wetting spray of water.

41. The method of propagating plants by cuttings which comprises supporting a plant cutting during the regeneration period thereof in air of a relative humidity of less than 100 per cent., and further subjecting said plant cutting substantially continuously during the time that it is supported in said air of said condition of a relative humidity of less than 100 per cent. to a washing spray of water.

42. The method of propagating plants by cuttings which comprises supporting a plant cutting during the regeneration period thereof with the non-regeneration region thereof in air of a relative humidity of less than 100 per cent., and further subjecting the said non-regeneration region of the said plant cutting substantially continuously during the time when it is supported in said air of said condition of a relative humidity of less than 100 per cent. to a spray of water.

43. The method of propagating plants by cuttings which comprises supporting a plant cutting during the regeneration period thereof with the non-regeneration region thereof in air of a relative humidity of less than 100 per cent., and further subjecting the said non-regeneration region of the said plant cutting substantially continuously during the time that it is supported in said air of said condition of a relative humidity of less than 100 per cent. to a humidifying spray of water.

44. The method of propagating plants by cuttings which comprises supporting a plant cutting during the regeneration period thereof with the non-regeneration region thereof in air of a relative humidity of less than 100 per cent., and further subjecting the said non-regeneration region of the said plant cutting substantially continuously during the time that it is supported in said air of said condition of a relative humidity of less than 100 per cent. to a wetting spray of water.

45. The method of propagating plants by cuttings which comprises supporting a plant cutting during the regeneration period thereof with the non-regeneration region thereof in air of a relative humidity of less than 100 per cent., and further subjecting the said non-regeneration region of the said plant cutting substantially continuously during the time that it is supported in said air of said condition of a relative humidity of less than 100 per cent. to a washing spray of water.

46. The method of plant propagation which includes the exposure of cuttings to fine mist and maintaining said mist upon the cuttings with sufficient continuity to keep such cuttings superficially wet for substantial periods.

47. The method of propagating plants by cuttings which comprises maintaining a film of water on the surfaces of the cutting during substantially the entire regeneration period.

48. The method of propagating plants by cuttings which comprises placing the cuttings in a chamber and maintaining a film of water on the surfaces of the cutting during substantially the entire regeneration period.

49. The method of propagating plants by cuttings which comprises placing the cuttings in a chamber and subjecting the cuttings to a water spray during substantially the entire regeneration period.

50. The method of propagating plants by cuttings which comprises placing the cuttings in a chamber and maintaining the relative humidity of the air in the immediate vicinity of the cuttings at a high level by subjecting the cuttings to a water spray during substantially the entire regeneration period.

MORRIS A. RAINES.

REFERENCES CITED

The following references are of record in the file of this patent:

UNITED STATES PATENTS

| Number | Name | Date |
| --- | --- | --- |
| 1,994,962 | Rushfeldt | Mar. 19, 1945 |

OTHER REFERENCES

Raines, "Some Uses of a Spray Chamber," Am. Jour. Bot., vol. 27, No. 10, page 18–S. Dec. 1940.

Curtis, "Stimulation of Root Growth," Cornell Agr. Expt. Sta., Memoir 14, page 97, August 1918.

Garden Encyclopedia, page 341, article on Cuttings, published 1936.

Hildreth, "Spraying is a New Method of Applying Root-Promoting Substances," Florists' Review, May 25, 1939.

Garden Dictionary, published 1936 by Houghton, Mifflin Co., N. Y., page 190, article on Cuttings.

Jahrbuecher fuer Wissenschaftliche Botantik, vol. 72, pp. 171, 172, 178. 1930.